Sept. 5, 1933.  W. WITHINGTON  1,925,357
RAKE
Filed Aug. 31, 1928
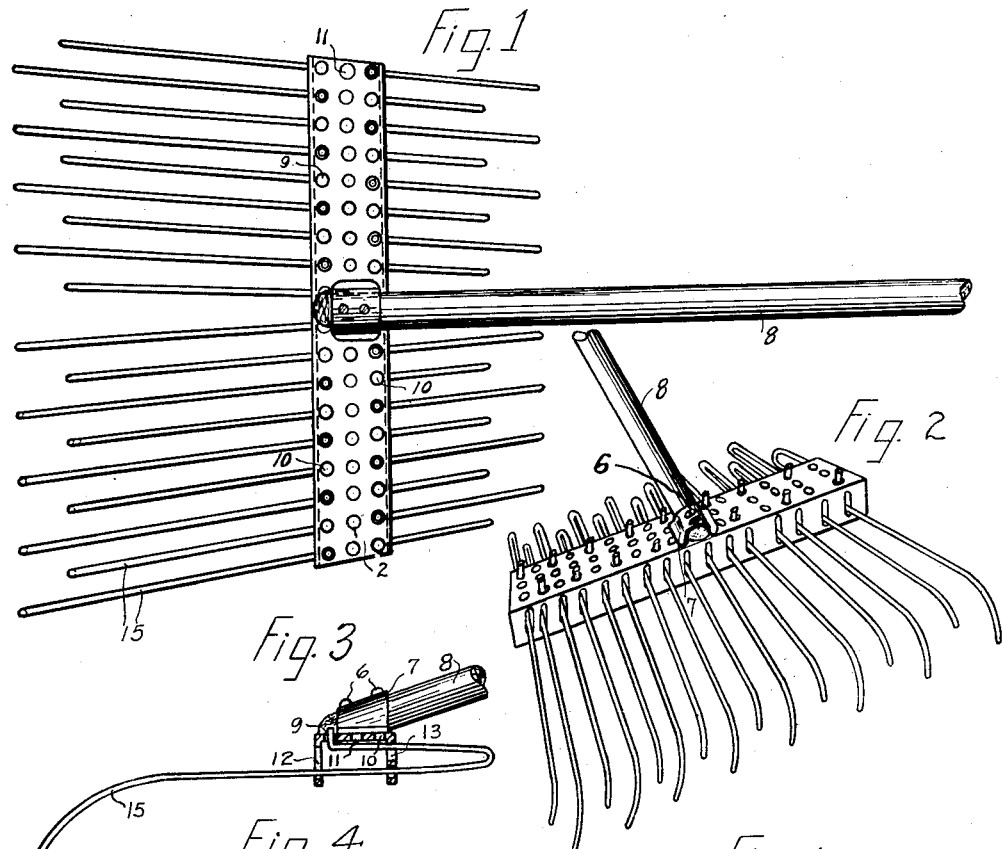
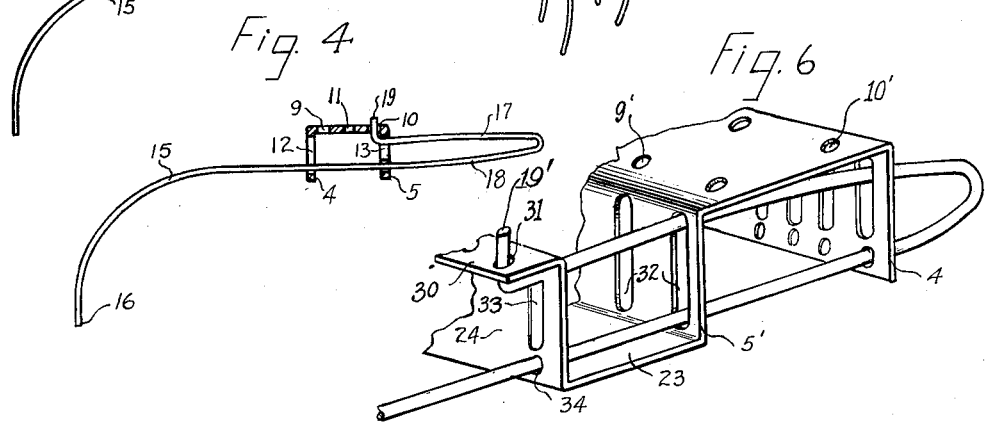
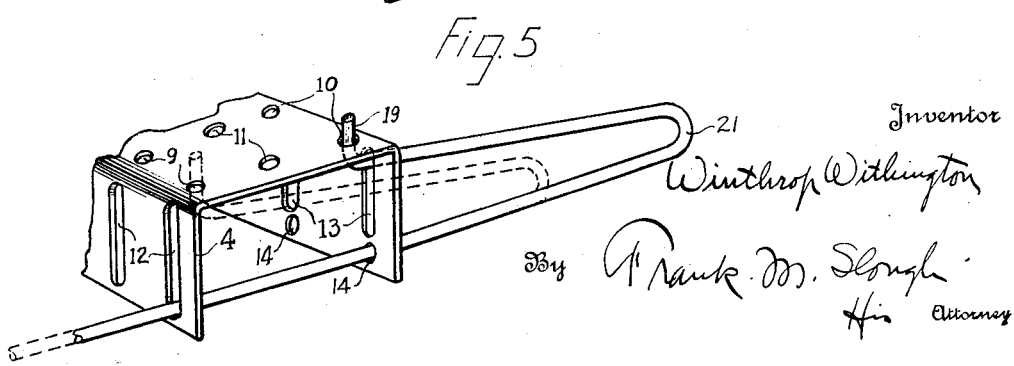
Inventor
Winthrop Withington
By Frank M. Slough
His Attorney Patented Sept. 5, 1933

1,925,357

UNITED STATES PATENT OFFICE 1,925,357

RAKE

Winthrop Withington, Cleveland, Ohio, assignor to The American Fork & Hoe Company, Cleveland, Ohio, a corporation of Ohio Application August 31, 1928. Serial No. 303,199

17 Claims. (Cl. 55—114)

My invention relates to rakes and relates to rakes adaptable for use for many purposes, such as for gardens, lawns, and for separating and collecting articles such as waste paper and the like from cinders, stones, and grass.

An object of my invention is to provide a rake of the above character, having adjustable tines.

Another object of my invention is to provide a rake having radially individually adjustable tines.

Another object of my invention is to provide a rake wherein the tines are individually separable from the head of the rake.

Another object of my invention is to provide a rake which is very efficient, wherein the tines may be made of resilient spring steel, and yet which may be manufactured at a low cost.

Another object of my invention is to provide a rake in which any of the above objects may be realized, and which can be manufactured with inexpensive manufacturing equipment.

Other objects of my invention and the invention itself will be better understood by reference to the following description of certain embodiments of my invention, and in which description reference will be had to the accompanying drawing illustrating the said embodiments.

In the drawing:

Fig. 1 is a plan view of a rake embodying the principles of my invention, the handle being illustrated as having its end broken away.

Fig. 2 is a perspective view of the rake of Fig. 1.

Figs. 3 and 4 are side elevational views of a tine in two differently adjusted positions relative to a fragment of the tine supporting head of the rake, shown in section, Fig. 3 also showing in elevation a fragment of the rake handle and securing means therefor.

Fig. 5 is a perspective view of a fragment of the rake head of the foregoing figures, with a single tine illustrated in a given adjusted position therein, and dotted lines being shown thereon indicative of an alternatively adjusted position of the tine relative to the head.

Fig. 6 is a perspective view of a rake which is a second embodiment of my invention.

Referring now first to Figs. 1 to 5, which illustrate a first embodiment of my invention, the rake head 2 is formed, preferably, of a single piece of sheet metal, to which by bolts 6 and a sheet metal strip 7, a handle 8 is secured, extending rearwardly from the head, and a short fragment of the handle being illustrated in Figs. 1, 2 and 3. The handle is inclined to the plane of the intermediate flat portion 3 of the head which comprises, also, depending channeled flanges 4 and 5.

The intermediate portion 3 of the rake head, is provided, preferably, with two spaced rows of small circular apertures 9 and 10, each row parallel to the other, extending longitudinally of the head and adjacent the depending flanges 4 and 5. A third row of apertures 11 may also be provided disposed intermediate the aforesaid rows of apertures 9 and 10.

The depending end flanges 4 and 5 are provided also with transversely extending slots 12 and 13 and the flange 5 being, moreover, preferably provided with a row of small circular apertures 14, each aperture 14 disposed between the longitudinal edge of the flange and one of the slots 13.

A plurality of individually removable and adjustable resilient metal tines 15, preferably of spring steel wire, are adapted to be secured within the head 2, these being inserted therein preferably from the outer side of the flange 5. The introduction of the tines into the head is accomplished preferably by introducing the tip end 16 of the tine through the aperture 14 and then projecting it through the slot 12 aligned therewith, meanwhile compressing the resilient arms 17 and 18 of the tine toward each other, and then finally inserting the retaining hook 19 at the end of the short tine arm 17, first through the slot 13 of the flange 5 and then relieving the compressive effort forcing the tine arms 17 and 18 together to effect projection of the retaining hook portion 19 of the tine arm 17 through one of the apertures through the intermediate portion 3 of the head, which is in longitudinal alignment with the arm 17.

In Fig. 4 the retaining hook 19 is thus projected through one of the apertures 9, whereas in Fig. 6, the tine is shown in a differently adjusted position wherein the retaining hook 19 is projected through one of the apertures 10. In a similar manner, the retaining hook 19 may be projected through one of the intermediate rows of apertures 11.

Colloquially, the head 2 may be said to be preferably "breach-loaded" by the projection of the tines from the rearmost side of the head.

It will be understood that some of the tines may have their retaining hook 19 projected through one row of apertures, such as the row 9, and that others of the tines may have their retaining hooks projected through one of the apertures 10 or 11, as the case may be. Figs. 1 and 2 show both arrangements simultaneously in the same head. Figs. 3 and 4 show alternately adjusted positions of a tine, as also do Figs. 5 and 6.

All of the tines are preformed with their end arms 18 and 17, respectively, at relatively more extended position and are compressed to the position illustrated in the drawing. Meanwhile, during the process of inserting the tines into the head, and due to the inherent resiliency of the material of the tines effecting an outwardly directed pressure in the effort of the tine arms to return to their normal extended position, the tines are securely anchored in place in the slots and apertures provided for their reception in the head.

At the same time the provision of the aperture 14 tends to reenforce the tine from its bend 21 to the flange 5, and the slot 12 permits a certain amount of movement of the tine in the slot, longitudinally of the slot, when the tips of the tines make engagement with the ground or extraneous objects, during use of the rake.

Referring now to the embodiment of my invention illustrated in Fig. 6, in addition to the channel comprising the intermediate portion 3', and flanges 4' and 5' corresponding to the similar integral parts 3, 4 and 5 of the channel of the foregoing embodiment, a second extension channel is provided comprising an intermediate portion 23 and side flanges 24 and 4', the flange 5' being common to the channels 2 and the extension channel. The channels are disposed facing in opposite directions in substantially S-form. The flange 24 is deflected forwardly to form a supplemental flange 30, which is provided with a row of apertures 31 adapted to receive the retaining hooks 19', which, in this form of the invention, may be disposed therein by projecting the tines forwardly of the positions illustrated in Figs. 1 to 5 inclusive.

The short arm 17 of the tines is in such case projected through the aligned slots 32 and 33 in the flanges 5' and 24 respectively. A row of small circular apertures 34 is provided in the flange 24 intermediate the row of slots 33 through said flange, and the extension channel portion 23, the tips 16 of the tine arms 18 being adapted to be projected through the apertures 34.

This embodiment of the invention also enables the tines to be adjusted longitudinally to a number of different positions, wherein the retaining hooks 19' may be received within one of the rows of apertures 10', 9' or 31, according to the length of tine tip desired. Thus the same rake may have tines either short and stiff or long and flexible, or both.

Having thus described my invention in different embodiments, I am aware that numerous and extensive departures may be made from the embodiments herein illustrated and described but without departing from the spirit of my invention.

I claim:

1. In a rake, a channel cross-head therefor, tines supported by the cross-head, each tine comprising a looped end and an elongated forwardly projected ground engaging tine tip extending from one of the arms of the loop, the other arm terminating in a laterally extending retaining tip, said cross head channel having a pair of side walls and an interposed connecting wall, all of said walls being apertured, the arm of said loop bearing the ground engaging tip extending through aligned apertures of the two side walls, the other arm of the loop projecting forwardly through a separate aperture of the rearmost side wall, and said retaining tip being projected through the connecting wall by spring pressure of the looped arms.

2. In a rake, a channel cross-head therefor, tines supported by the cross-head, each tine comprising a looped end and an elongated forwardly projected ground engaging tine tip extending from one of the arms of the loop, the other arm terminating in a laterally extending retaining tip, said cross-head channel having a pair of side walls and an interposed connecting wall, all of said walls being apertured, the arm of said loop bearing the ground engaging tip extending through aligned apertures of the two side walls, the other arm of the loop projecting forwardly through a separate aperture of the rearmost side wall, and said retaining tip being projected through the connecting wall by spring pressure of the looped arms, the apertures of the forwardly disposed channel side wall being elongated to permit up and down reciprocation of the rear portion of the ground engaging tip, when the rake is in operation.

3. In a rake, a channel cross-head therefor, tines supported by the cross-head, each tine comprising a looped end and an elongated forwardly projected ground engaging tine tip extending from one of the arms of the loop, the other arm terminating in a laterally extending retaining tip, said cross head channel having a pair of side walls and an interposed connecting wall, all of said walls being apertured, the arm of said loop bearing the ground engaging tip extending through aligned apertures of the two side walls, the other arm of the loop projecting forwardly through a separate aperture of the rearmost side wall, and said retaining tip being projected through the connecting wall by spring pressure of the looped arms, the aperture of the rearmost channel side wall through which said short arm is projected, being elongated to permit the arms to be drawn together when inserting or removing the tine from the channel-head.

4. In a rake, a channel cross-head therefor, tines supported by the cross-head, each tine comprising a looped end and an elongated forwardly projected ground engaging tine tip extending from one of the arms of the loop, the other arm terminating in a laterally extending retaining tip, said cross-head channel having a pair of side walls and an interposed connecting wall, all of said walls being apertured, the arm of said loop bearing the ground engaging tip extending through aligned apertures of the two side walls, the other arm of the loop projecting forwardly through a separate aperture of the rearmost side wall, and said retaining tip being projected through the connecting wall by spring pressure of the looped arms, the apertures of the forwardly disposed channel side wall being elongated to permit up and down reciprocation of the rear portion of the ground engaging tip, when the rake is in operation, the aperture of the rearmost channel side wall through which said short arm is projected, being elongated to permit the arms to be drawn together when inserting or removing the tine from the channel-head.

5. In a rake, a channel cross head therefor, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said channel cross head having a pair of side walls and an interposed connecting wall, said side walls each being apertured, and said interposed connecting wall having a plurality of apertures therein, the longer of said arms passing through an aperture of each of said side walls, and the shorter of said arms being projected through a separate aperture of the rearmost only of said walls, and its laterally projecting tip portion being projected through any suitable aperture in the interposed connecting wall.

6. In a rake, a cross head therefor, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head, having generally vertical apertured walls and at least one generally horizontal portion having a plurality of apertures therein spacing said walls, the longer of said arms passing through an aperture in the most forward of said walls and a separate aperture in the rearmost of said walls and the shorter of said arms being projected through an aperture in the rearmost only of said walls and its laterally projecting tip being projected through any suitable aperture in said horizontal portion.

7. In a rake, a channel cross head therefor, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said channel cross head, having a pair of side walls and an interposed connecting wall, said side walls being provided with vertically disposed slots in substantially parallel alignment to each other, the rearmost of said walls being also provided with a row of apertures disposed between the longitudinal edge of the said rear wall and the said slots disposed therein, and said interposed connecting wall being apertured, and the longer of said arms passing through a slot in the front side wall and an aperture in the rear side wall and the shorter of said arms being projected through a slot in the rearmost only of said walls and its laterally projecting tip being projected through said aperture in the interposed connecting wall.

8. In a rake, a cross head therefor, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head, having generally vertical walls and at least one generally horizontal portion adapted to space said walls, said walls being provided with vertically disposed slots in substantially parallel alignment to each other, the rearmost of said walls being also provided with a row of apertures disposed between the longitudinal edge of the said rear wall and the said slots disposed therein, and at least one of said horizontal portions being apertured, and the longer of said arms passing through a slot in the front wall and an aperture in the rear wall and the shorter of said arms being projected through a slot in the rearmost only of said walls and its laterally projecting tip being projected through said aperture in the interposed horizontal wall.

9. In a rake, a channeled cross head, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head being provided with a pair of side walls and an interposed wall portion, said side walls being provided with vertically disposed slots in substantially parallel alignment to each other, the rearmost of said side walls being also provided with a row of apertures disposed between the longitudinal edge of the said rear walls and the said slots disposed therein, and said interposed connecting wall having a plurality of apertures therein, the longer of said arms, passing thru a slot in the most forward of said side walls and an aperture in the rearmost side walls and the shorter of said arms being projected through a slot in the rearmost only of said walls, and its laterally projecting tip portion being projected through any suitable aperture in the interposed wall to effect a determined flexibility of the tines.

10. In a rake, a channeled cross head, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head being provided with a pair of side walls and an interposed wall portion, said side walls and interposed wall each being apertured and the rearmost of said side walls being also provided with slots substantially aligned with said rear wall apertures, the longer of said arms being projected through an aperture in each of said side walls and the shorter of said arms being projected through said slot in said rear wall and its laterally projected tip portion being projected through an aperture in said interposed wall portion.

11. In a rake, a cross head, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head being provided with generally vertical apertured wall portions and an interposed wall portion, said walls and interposed wall portion each being apertured and the rearmost of said walls being also provided with slots substantially aligned with said rear wall apertures, the longer of said arms being projected through an aperture in each of said walls and the shorter of said arms being projected through said slot in said rear wall and its laterally projected tip portion being projected through an aperture in said interposed wall portion.

12. In a rake, a channeled cross head, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head being provided with a pair of side walls and an interposed wall portion, said side walls each being apertured and the rearmost of said side walls being also provided with slot substantially aligned with said rear wall apertures, and said interposed wall being provided with a plurality of apertures, the longer of said arms being projected through an aperture in each of said side walls and the shorter of said arms being projected through said slot in said rear wall and its laterally projected tip portion being projected through any suitable aperture in said interposed wall to effect a determined flexibility of the tines.

13. In a rake, a cross head, a plurality of tines adapted to be supported by the cross head, each comprising a looped end, one of the arms of the loop being relatively long and adapted for projection relatively of the cross head for engagement with terrene operated upon by the rake, the other arm being relatively short and terminating in a laterally projecting tip, said cross head being provided with generally vertical apertured wall portions and at least one generally horizontal portion, said wall portions each being apertured and the rearmost of said wall portions being also provided with slots substantially aligned with said rear wall apertures, and at least one of said horizontal portions being provided with a plurality of apertures, the longer of said arms being projected through an aperture in each of said side walls and the shorter of said arms being projected through said slot in said rear wall and its laterally projected tip portion being projected through any suitable aperture in at least one generally horizontal portion to effect a determined flexibility of the tines.

14. In a rake, a channel cross head having apertured forwardly and rearwardly disposed channel side walls and a flange extension projecting forwardly from the upper edge of the said forwardly disposed wall, said walls and said flange being apertured and a plurality of tines adapted to be supported by said head, each of said tines terminating at its rear end in an integrally resilient loop having arms of unequal length, the longer arm terminating in the ground engaging tip, the shorter tine terminating in a retaining tip turned outwardly in a direction away from the longer arm, said loop adapted to be projected through aligned apertures in the said forwardly and rearwardly disposed channel walls, and said retaining tip adapted to be resiliently maintained in position projected through an aperture of said flange by the inherent resiliency of the loop arms, compressed toward each other during insertion through said aligned apertures, continuously tending to recover their more extended normal relative positions.

15. In a rake, a channeled cross head comprising an apertured web portion having depending flange portions, and a forwardly disposed flange extension substantially at right angles to the most forward of the depending flange portions and having an upwardly vertically extending wall member substantially parallel with said depending flange portions, said vertical portion terminating in an apertured supplemental web disposed substantially at right angles to said flange portions, said supplemental web being also in the plane of said primary web portion, said vertical portions of said flange extension and said depending flange portions each being provided with slots in substantial alignment to each other and said vertical portion and the rearmost of said depending flange portions being each provided with a row of apertures disposed between the longitudinal edge of said portions and the said slots disposed therein, a plurality of tines adapted to be supported by said cross head and said flange extension, each of said tines comprising a loop end, one of the arms of the loops being relatively long and projected through an aperture in said vertical portion and said rear depending flange portion and the shorter of said arms projecting through each of the said aligned slots in the depending flange and vertical portions, and a laterally projecting tip thereof being projected through an aperture in either said primary or supplemental web portions.

16. In a rake, a channel cross head therefor, tines supported by the cross head, each tine comprising a looped end and an elongated forwardly projected ground engaging tine tip extending from one of the arms of the loop, the other arm terminating in a laterally extending retaining tip, the cross head channel having a pair of normally vertically disposed walls and a horizontally disposed wall, all of the walls being apertured, the arm of the loop bearing the ground engaging tip extending through aligned apertures of the two vertical walls, the other arm of the loop projected forward through a separate aperture of one of the vertical walls and said retaining tip being projected through a perforation in the horizontal wall by spring pressure of the looped arms.

17. In a rake, a channeled cross-head having apertured parallel channel side walls, and an intermediate apertured wall connecting them, a plurality of wire tines, each of said tines terminating at its rear end in a resilient hook and projecting forwardly therefrom by a ground engageable tine portion projected through both of said parallel channel walls, the free end of the hook being projected through a separate aperture in the rearmost of said walls and terminating in an abruptly bent tip removably insertable through apertures of said intermediate wall.

WINTHROP WITHINGTON.